US012173869B1

(12) United States Patent
Zheng

(10) Patent No.: US 12,173,869 B1
(45) Date of Patent: Dec. 24, 2024

(54) FOLDABLE LIGHT ASSEMBLY

(71) Applicant: Lihua Zheng, Shenzhen (CN)

(72) Inventor: Lihua Zheng, Shenzhen (CN)

( * ) Notice: Subject to any disclaimer, the term of this patent is extended or adjusted under 35 U.S.C. 154(b) by 0 days.

(21) Appl. No.: 18/673,495

(22) Filed: May 24, 2024

(30) Foreign Application Priority Data

Apr. 15, 2024 (CN) ......................... 202420782590.7

(51) Int. Cl.
*F21V 17/10* (2006.01)

(52) U.S. Cl.
CPC .................................. *F21V 17/107* (2013.01)

(58) Field of Classification Search
CPC ............................... F21V 17/107; F21V 21/30
See application file for complete search history.

(56) References Cited

U.S. PATENT DOCUMENTS 6,607,284 B1 * 8/2003 Tsai .......................... F21S 4/20 362/121
6,769,796 B1 * 8/2004 Trammell ................. B44C 5/00 362/450
2014/0362555 A1 * 12/2014 Turk ...................... G03B 15/02 362/3
2019/0113464 A1 * 4/2019 Tingle ................ G01N 21/8803

* cited by examiner

*Primary Examiner* — Thomas M Sember
(74) *Attorney, Agent, or Firm* — Daniel M. Cohn; Howard M. Cohn

(57) ABSTRACT

A foldable light assembly is provided. The foldable light assembly includes support units and lock catch units. The support units are configured to form an annular shape in a plane, boundary lines are respectively formed between adjacent support units, and the boundary lines radially extend in the plane. The lock catch units are configured to respectively lock the adjacent support units, The support frames 12 are enclosed to form the annular shape, under limitation of the lock catch units, the support frames are stably combined to form a snowflake pattern or other special patterns to achieve a more attractive appearance. Moreover, the support units are continuously folded in sequence through the hinge units, the foldable lamp assembly does not need to be packaged in a specific shape, a space that the foldable lamp assembly is occupied is reduced.

16 Claims, 18 Drawing Sheets

FOLDABLE LIGHT ASSEMBLY

TECHNICAL FIELD

The present disclosure relates to a technical field of light devices for decoration, and in particular to a foldable light assembly.

BACKGROUND

Nowadays, a light, in particular a decorative light, is provided with a light string to fix on an ornament, which displays a specific shape on the ornament using light emitted by the light string in the dark, so as to achieve an expected decorative effect, for example, the light emitted by the light string may form a specific shape, such as characters on a signboard, a snowflake shape, or other special patterns. Current decorative lights are generally integrally formed, light strings are directly wound and connected on a decorative frame, assembly of which is tedious, thereby wasting time and energy. Moreover, the current decorative lights are unable to be folded for storage, thereby occupying a large space, high storage and transportation costs are caused.

Chinese patent No. CN219300623U discloses an anti-pull-off decorative light and an anti-pull-off light string, in which a light strip is placed in a support frame having a preset specific shape to obtain a decorative light with an attractive appearance. However, the support frame having the preset specific shape is inconvenient in packaging and transportation, a transportation cost of the anti-pull-off light string is increased and the support frame thereof having the preset specific shape is even easy to be damaged. Therefore, it is necessary to provide a foldable light assembly.

SUMMARY

In order to overcome shortcomings in the prior art, the present disclosure provides a foldable light assembly, the foldable light assembly reduces a space occupied thereby, storage and transportation spaces thereof are saved, so that corresponding storage and transportation costs are reduced to reduce a production cost.

Technical solutions of the present disclosure are as follows.

The present disclosure provides the foldable light assembly, including support units and lock catch units. The support units are configured to form an annular shape in a plane, boundary lines are respectively formed between adjacent support units, and the boundary lines radially extend in the plane. The lock catch units are configured to respectively lock the adjacent support units.

Furthermore, the foldable light assembly further includes hinge units. Axes of the hinge units respectively extend along the boundary lines and are configured to connect the adjacent support units and fold the adjacent support units with each other.

Furthermore, each of the support units is in a fish-shaped framework in the plane, and each of the support units includes two lock catch frames and support frames. The two lock catch frames are respectively disposed at two sides of each of the support units that form the boundary lines and are configured to mount corresponding lock catch units and corresponding hinge units. The support frames and the two lock catch frames extend in the plane and are connected with each other, and the support frames are configured to mount a flexible light strip.

Furthermore, each of the two lock catch frames includes two lock catch walls being parallel with each other, the two lock catch walls are perpendicular to the plane, and the two lock catch walls extend along a length direction of a corresponding one of the two lock catch frames. Transverse support plates are disposed between the two lock catch walls, the transverse support plates are connected with the two lock catch walls, perpendicular to the two lock catch walls, and perpendicular to the length direction of the corresponding one of the two lock catch frames.

Furthermore, each of the support frames includes two support walls being parallel with each other, the two support walls are perpendicular to the plane, and the two support walls extend along a length direction of a corresponding one of the support frames. Trailing edge plates are disposed between the two support walls, the trailing edge plates are connected with the two support walls, perpendicular to the two support walls, and parallel to the length direction of the corresponding one of the support frames. The two support walls and the trailing edge plates are enclosed to form a groove-shaped channel, the groove-shaped channel is configured to lay the flexible light strip along the length direction of the corresponding one of the support frames.

Furthermore, each of the hinge units is disposed on adjacent lock catch frames on different support units. Opening/closing directions of adjacent hinge units are opposite, so that the adjacent support units are capable of being continuously folded along a corresponding one of the boundary lines.

Furthermore, each of the hinge units includes two hinges being symmetrical. The two hinges are respectively disposed in the adjacent lock catch frames on the different support units, and the adjacent support units are connected through a hinge pin of each of the hinge units. elastic lock tongues are respectively disposed at two ends of each of the two hinges being symmetrical in an axis direction of the hinge pin and are configured to be respectively connected into rectangular lock holes on the transverse support plates in each of the two lock catch frames.

Furthermore, each of the lock catch units includes a lock catch plate. A first elastic pivot and a second elastic pivot are respectively disposed at two ends of the lock catch plate being symmetrical in a length direction of the lock catch plate, axes of the first elastic pivot and the second elastic pivot are parallel to an axis of the hinge pin, and the first elastic pivot and the second elastic pivot are configured to be respectively connected into pivot holes on the transverse support plates in each of the two lock catch frames. An elastic lock catch having a U-shaped bend is disposed on a middle at one side in a width direction of the lock catch plate, and the elastic lock catch is configured to be connected into a rectangular lock groove defined on an adjacent lock catch wall of an adjacent lock catch frame and extending in a length direction of the adjacent lock catch wall. The lock catch plate and the two hinges are respectively disposed at two opposite sides of one of the two lock catch frames in a height direction thereof, the lock catch plate is disposed corresponding to the two hinges.

Furthermore, rectangular notches are respectively recessed from two edges in a height direction of one of the lock catch walls facing the corresponding one of the boundary lines, the rectangular notches extend in a length direction of the one of the lock catch walls and are configured to limit the two hinges and the lock catch plate.

Furthermore, each of the elastic lock tongues includes an elastic transverse section and an inclined lock hook. The elastic transverse section extends backward along an inner side of a corresponding one of the transverse support plates and is parallel to the corresponding one of the transverse support plates. The inclined lock hook extends from a tail portion of the elastic transverse section toward a width direction of the elastic transverse section, and the inclined lock hook is matched with a corresponding one of the rectangular lock holes on a corresponding one of the transverse support plates in each of the two lock catch frames.

Furthermore, the first elastic pivot includes a first short shaft and a first wedge groove, the second elastic pivot includes a second short shaft and a second wedge groove. The first short shaft and the second short shaft are coaxially disposed and are respectively matched with the pivot holes. The first wedge groove is connected to a root of the first short shaft, the second wedge groove is connected to a root of the second short shaft, the first wedge groove and the second wedge groove are perpendicular to axis directions of the first elastic pivot and the second elastic pivot for elastic deformation of the first elastic pivot and the second elastic pivot.

Furthermore, the elastic lock catch includes a U-shaped elastic component. The U-shaped elastic component includes an inner side piece and an outer side piece, the inner side piece of the U-shaped elastic component and the outer side piece of the U-shaped elastic component are perpendicular to a plane of the lock catch plate. The inner side piece of the U-shaped elastic component is connected to a middle of one side in a length direction of the lock catch plate, and a bottom of the U-shaped elastic component extends backward along the two lock catch walls. A lock catch tongue is disposed on the outer side piece of the U-shaped elastic component, and the lock catch tongue is matched with the rectangular lock groove defined on the adjacent lock catch wall of the adjacent lock catch frame. A manual shifting piece is disposed at a front end of the outer side piece of the U-shaped elastic component away from a bottom of the U-shaped elastic component and is configured to quickly operate a corresponding one of the lock catch units in a lock processing.

Furthermore, a limiting notch is defined at a side edge of the elastic lock catch of the lock catch plate for elastic deformation of the elastic lock catch during operation.

Furthermore, each of the support frames includes a primary support frame and secondary support frames. A center line of the primary support frame coincides with a symmetrical bisector of the two lock catch frames of each of the support units, and a tail portion of the primary support frame has sub supports radially disposed. The secondary support frames are communicated with the primary support frame and are respectively disposed at both sides of the primary support frame. Tail ends of corresponding secondary support frames that connected to the primary support frame are respectively connected to ends of the two lock catch frames.

Furthermore, limiting flanges are respectively disposed at front edges of inner sides of the two support walls of each of support frames for preventing the flexible light strip from slipping off, the limiting flanges are opposite to each other and are disposed at an interval, and each of the limiting flanges is disposed along the length direction of the corresponding one of the support frames.

Furthermore, positioning flanges opposite to each other are respectively disposed on side edges of the trailing edge plates and respectively extend frontward along inner sides of the two support walls, and the positioning flanges are configured to limit the flexible light strip between the two support walls.

Furthermore, six support units, six lock catch units, and five hinge units are provided. The six support units are configured to enclose to form the annular shape, so that six support frames form a snowflake structure, the six lock catch units are configured to lock the six support units with each other, and the five hinge units are configured to continuously fold the six support units into six layers in sequence.

Furthermore, the foldable light assembly includes the six support units, the six lock catch units, the five hinge units, and the flexible light strip.

Beneficial effects of the present disclosure are as follows.

First, the foldable light assembly of the present disclosure is in the annular shape enclosed by the support units, each of the lock catch units perform limitation on the adjacent support units, so that the foldable light assembly of the present disclosure stably form the snowflake structure or other structure in special patterns to have more attractive appearance.

Second, the foldable light assembly of the present disclosure provides the hinge units respectively on the adjacent lock catch frames on the different support units to continuously fold the support units in sequence, the space occupied thereby is reduced, the storage and transportation spaces thereof are saved, so that the corresponding storage and transportation costs are reduced to reduce the production cost.

Third, the foldable light assembly of the present disclosure provides the groove-shaped channel on each of the support frames of the support units, the limiting flanges and the positioning flanges are disposed in the groove-shaped channel, thereby facilitating assembly and fixation of the flexible light strip.

BRIEF DESCRIPTION OF DRAWINGS

In order to more clearly illustrate embodiments of the present disclosure or technical solutions in the prior art, accompanying drawings required in the embodiments or the prior art are briefly introduced below, and obviously, the accompanying drawings in following description are merely some embodiments of the present disclosure, and for those who skilled in the art, other drawings may also be obtained according to structures shown in the accompanying drawings without creative efforts.

Figure 1:
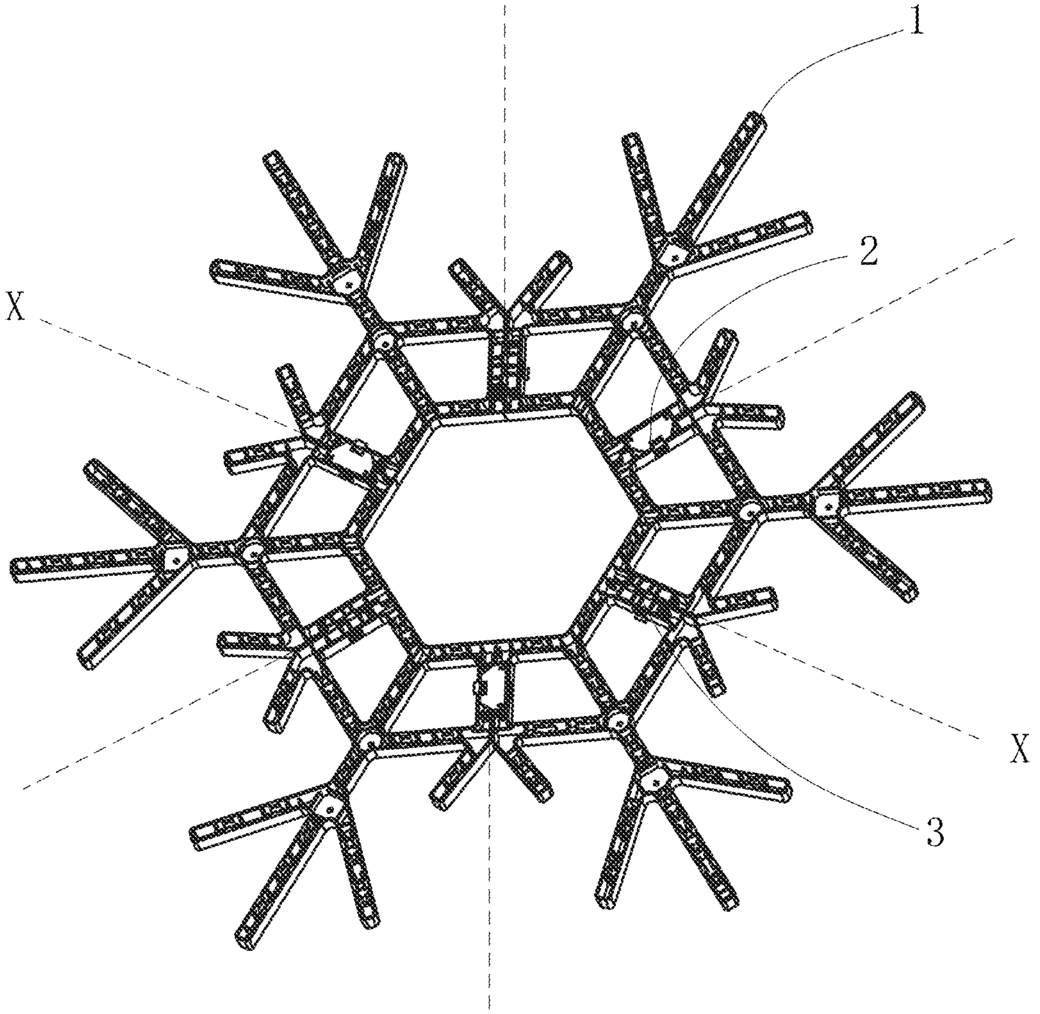
FIG. 1 is a structural schematic diagram of a foldable light assembly being in an unfolded state according to a first embodiment of the present disclosure.

Reference numerals in the drawings: 1. support unit; 11. lock catch frame; 111. lock catch wall; 111*a*. rectangular lock groove; 112. transverse support plate; 112*a*. rectangular lock hole; 112*b*. pivot hole; 113. rectangular notch; 12. support frame; 12*a*. primary support frame; 12*b*. secondary support frame; 121. support wall; 122. trailing edge plate; 123. groove-shaped channel; 124. limiting flange; 125. positioning flange; 2. lock catch unit; 21. lock catch plate; 22. first elastic pivot/second elastic pivot; 221. first short shaft/second short shaft; 222. first wedge groove/second wedge groove; 23. elastic lock catch; 231. U-shaped elastic component; 231*a*. inner side piece; 231*b*. outer side piece; 232. lock catch tongue; 233. manual shifting piece; 25. limiting notch; 3. hinge unit; 31. flange; 33. elastic lock tongue; 331. elastic transverse section; 332. inclined lock hook; 4. flexible light strip.

DETAILED DESCRIPTION OF EMBODIMENTS

Technical solutions in embodiments of the present disclosure are clearly and completely described below with reference to accompanying drawings in the embodiments of the present disclosure. All other embodiments obtained by those who skilled in the art based on the embodiments of the present disclosure without creative efforts shall fall within a protection scope of the present disclosure.

First Embodiment

Please refer to FIG. 1, FIG. 1 illustrates a foldable light assembly according to the first embodiment of the present disclosure, the foldable light assembly of the first embodiment of the present disclosure includes support units 1 and lock catch units 2. The support units 1 are enclosed to form an annular shape in a plane, boundary lines X are respectively formed between adjacent support units 1, the boundary lines X radially extend in the plane, and the boundary lines X are virtual. The lock catch units 2 are configured to respectively lock the adjacent support units 1 respectively at left and right sides of a corresponding one of the boundary lines X with each other, which enables the support units 1 to enclose to form a stable annular structure. In the embodiment, six support units 1 and six lock catch units 2 are provided. The six support units 1 are enclosed to form an annular snowflake shape, the adjacent support units 1 are connected and locked through a corresponding one of the lock catch units 2, thereby forming the foldable light assembly with a stable snowflake structure.

When using the foldable light assembly, the adjacent support units 1 are quickly locked through the corresponding one of the lock catch units 2, thereby forming the foldable light assembly with the stable snowflake structure. When the lock catch units 2 are unlocked, the adjacent support units 1 are then disconnected, the support units 1 are capable of being stacked one by one, which reduces a space occupied by the unfolded light assembly and further saves storage and transportation spaces.

Figure 2:
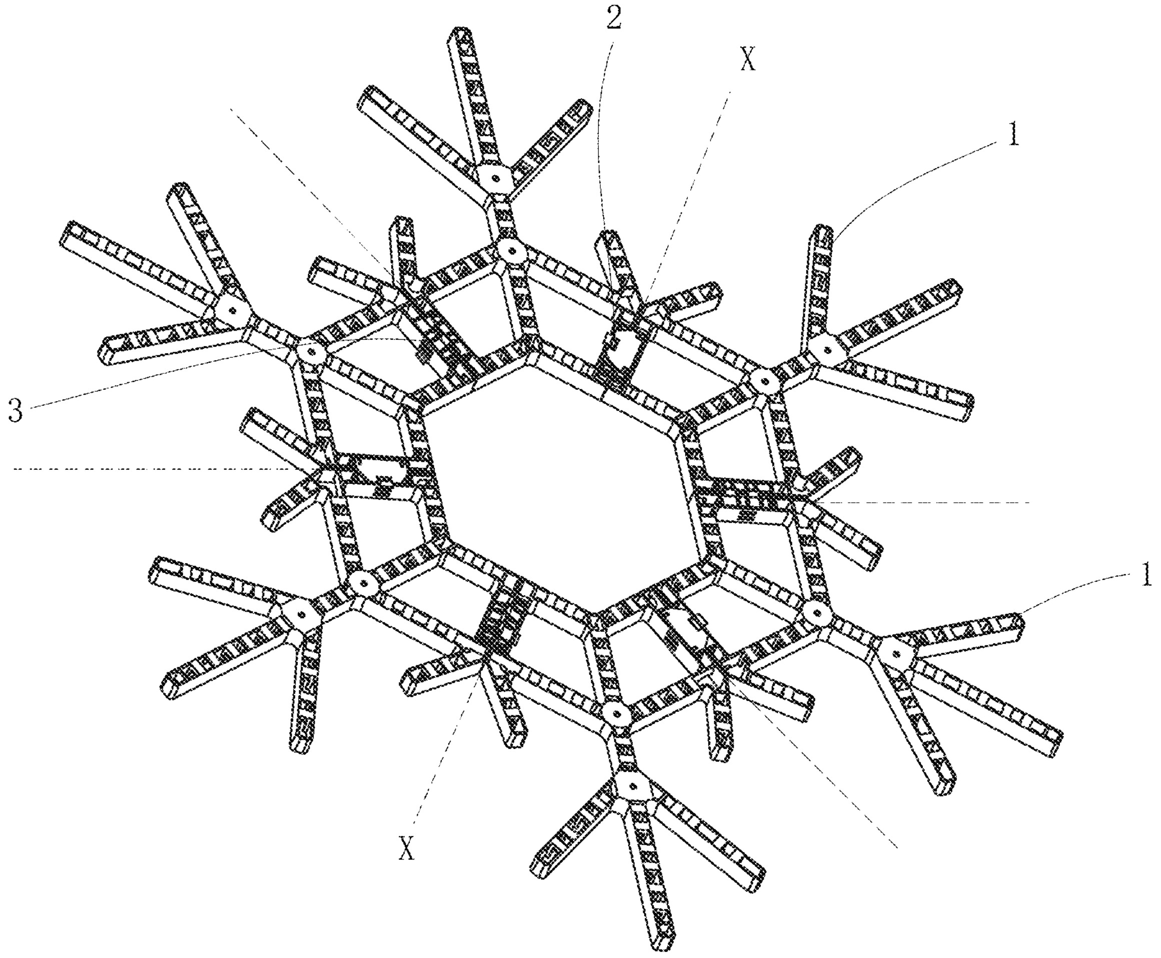
FIG. 2 is another structural schematic diagram of the foldable light assembly being in the unfolded state according to the first embodiment of the present disclosure.
Figure 3:
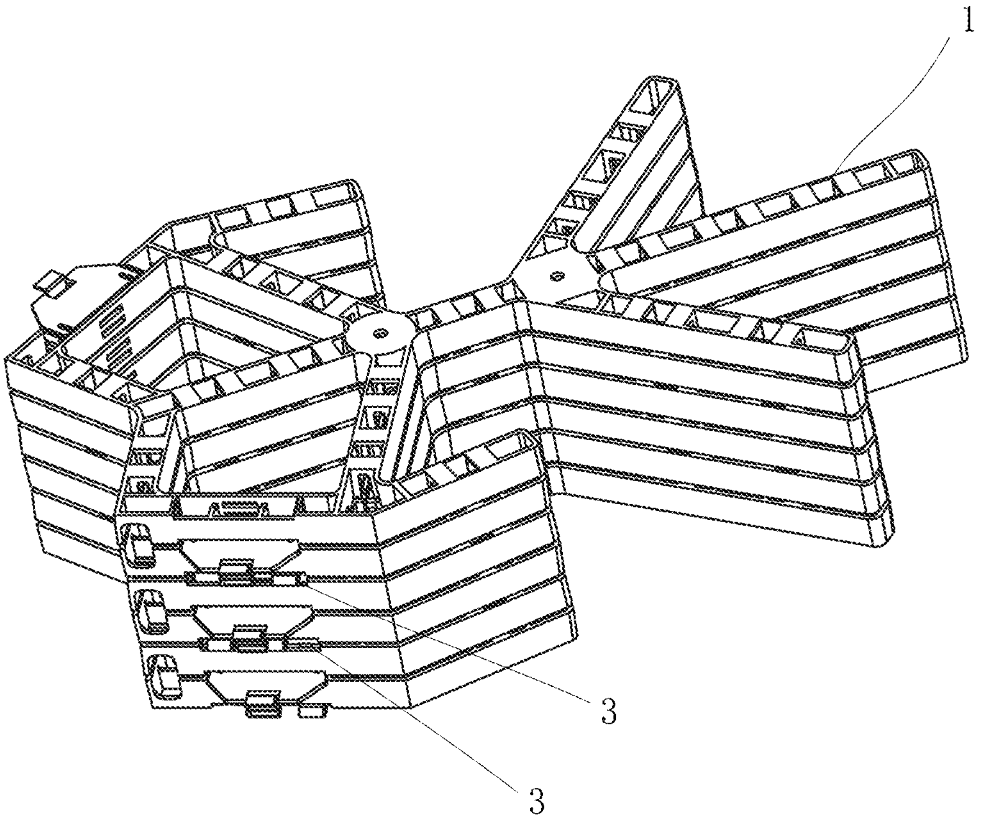
FIG. 3 is a structural schematic diagram of the foldable light assembly being in a folded state according to the first embodiment of the present disclosure.

As shown in FIGS. 2-3, the foldable light assembly further includes hinge units 3, in the embodiment, the six support units 1 are provided, the six support units 1 are enclosed to form the annular shape in the plane, the boundary lines X are respectively formed between the adjacent support units 1, and five hinge units 3 are provided for connecting the adjacent support units 1. Axes of the hinge units 3 respectively extend along the boundary lines X, the hinge units 3 are disposed corresponding to the lock catch units 2, and the hinge units 3 are configured to connect the adjacent support units 1 and fold the adjacent support units 1 with each other. It should be noted that first sides of the adjacent support units 1 are rotatably connected through a corresponding one of the hinge units, second sides of the adjacent support units are connected and locked through a corresponding one of the lock catch units 2 disposed corresponding to the corresponding one of the hinge units.

When folding the foldable lamp assembly is folded, the corresponding one of the lock catch units 2 between the adjacent support units 1 is unlocked, that is, a locking state between the adjacent support units 1 is removed, and then the adjacent support units 1 are continuously folded in sequence along a corresponding one of the boundary lines X, and the foldable lamp assembly being folded is as shown in FIG. 3, in this way an occupied space of the foldable lamp assembly is reduced, and in a transportation process, the foldable lamp assembly does not need to be packaged in a specific shape, such as snowflakes, so that storage and transportation spaces are further saved, and a production cost is reduced.

As shown in FIGS. 1, 2, 4, and 5, each of the support units 1 is in a fish-shaped framework in the plane, and each of the support units 1 includes two lock catch frames 11 and support frames 12. The support frames 12 and the two lock catch frames 11 extend in the plane and are connected with each other, and the support frames 12 are configured to mount a flexible light strip. In one embodiment, the support frames 12 and the two lock catch frames 11 are integrally formed.

The two lock catch frames 11 are respectively disposed at two sides of each of the support units 1 that form the boundary lines X and are configured to mount corresponding lock catch units 2 and corresponding hinge units 3. Specifically, the two lock catch frames 11 are respectively disposed at the two sides of each of the support units 1 that form the boundary lines X, each of the lock catch units 2 is disposed on one of the two lock catch frames 11, and each of the hinge units 3 are correspondingly disposed on another one of the lock catch frames 11, and mounting positions of the corresponding lock catch units 2 and the corresponding hinge units 3 on the two lock catch frames 11 are interchangeable.

Figure 5:
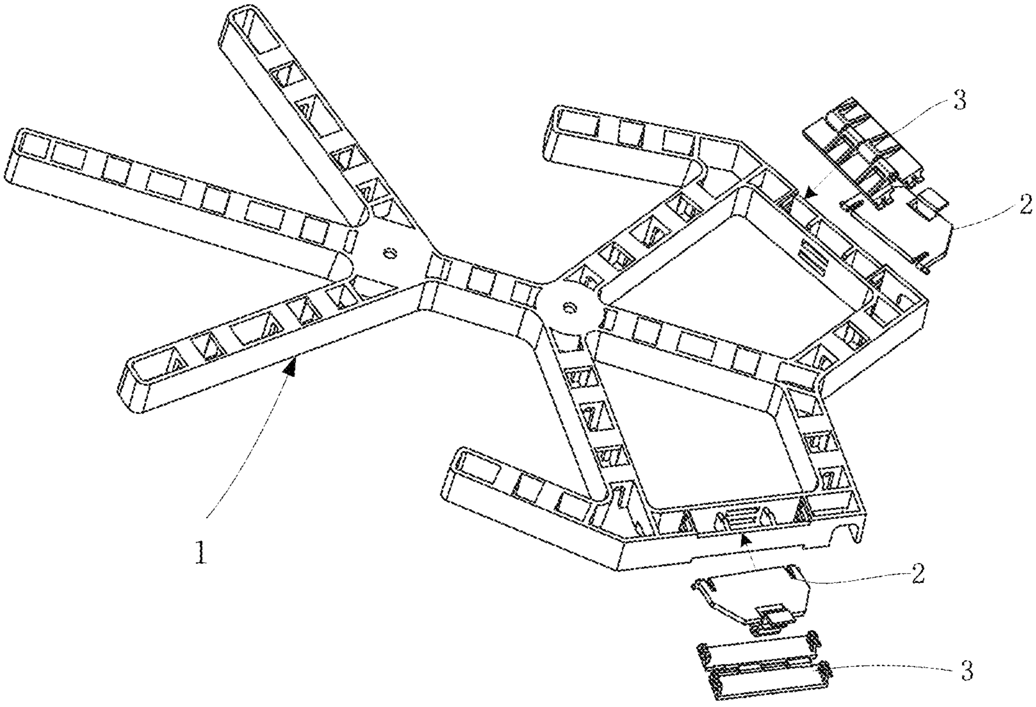
FIG. 5 is an exploded schematic diagram of the support unit, a lock catch unit, and a hinge unit according to the first embodiment of the present disclosure.

It should be noted that, as shown in FIG. 5, each of the two lock catch frame 11 includes an upper lock catch frame 11 and a lower lock catch frame 11, the upper lock catch frame 11 and the lower lock catch frame are respectively disposed at the two sides of each of the support units 1. For a first side of each of the support units 1, a corresponding one of the lock catch units 2 is disposed on the upper lock catch frame 11, and a corresponding one of the hinge units 3 is disposed on the lower lock catch frame 11; meanwhile, for a side of each of the support units, a corresponding one of the hinge units 3 is disposed on the upper lock catch frame 11, and a corresponding one of the lock catch units 2 is disposed on the lower catch frame 11. That is, for the two lock catch frames 11 respectively disposed at the two sides of each of the support units 1 that form the boundary lines X, corresponding lock catch units 2 and corresponding hinge units 3 are disposed in a staggered configuration.

As shown in FIGS. 4-7, each of the two lock catch frames 11 on each of the support units 1 includes two lock catch walls 111 being parallel with each other, the two lock catch walls 111 are perpendicular to the plane, and the two lock catch walls 111 extend along a length direction of a corresponding one of the two lock catch frames 11. Two transverse support plates 112 are disposed between the two lock catch walls 111, the two transverse support plates 112 are connected with inner walls of the two lock catch walls 111, perpendicular to the two lock catch walls 111, and perpendicular to the length direction of the corresponding one of the two lock catch frames 11.

Figure 7:
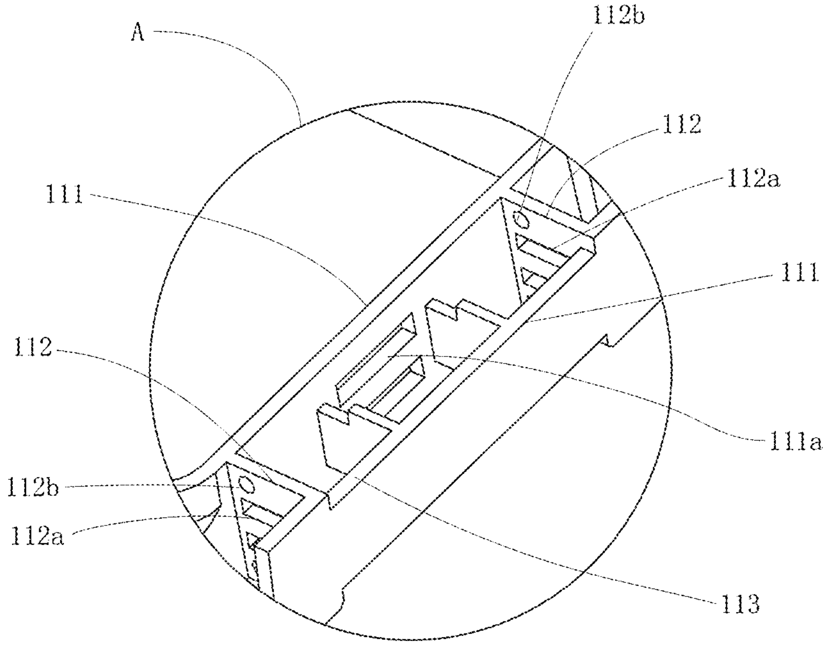
FIG. 7 is an enlarged schematic diagram of portion A shown in FIG. 6.

A specific structure of one of the two lock catch frames 111 is as shown in FIG. 7, rectangular notches 113 are respectively recessed from two edges in a height direction of one of the lock catch walls 111 facing the corresponding one of the boundary lines X, the rectangular notches 113 extend in a length direction of the one of the lock catch walls 11 and are configured to limit the lock catch units 2 and the hinge units 3, a rectangular lock groove 111*a* is defined on one of the lock catch walls 111 of each of the lock catch frame 11 away from the corresponding one of the boundary lines X. Rectangular lock holes 112*a* and pivot holes 112*b* are respectively disposed on the two transverse support plates 112 in each of the two lock catch frames 11.

Figure 4:
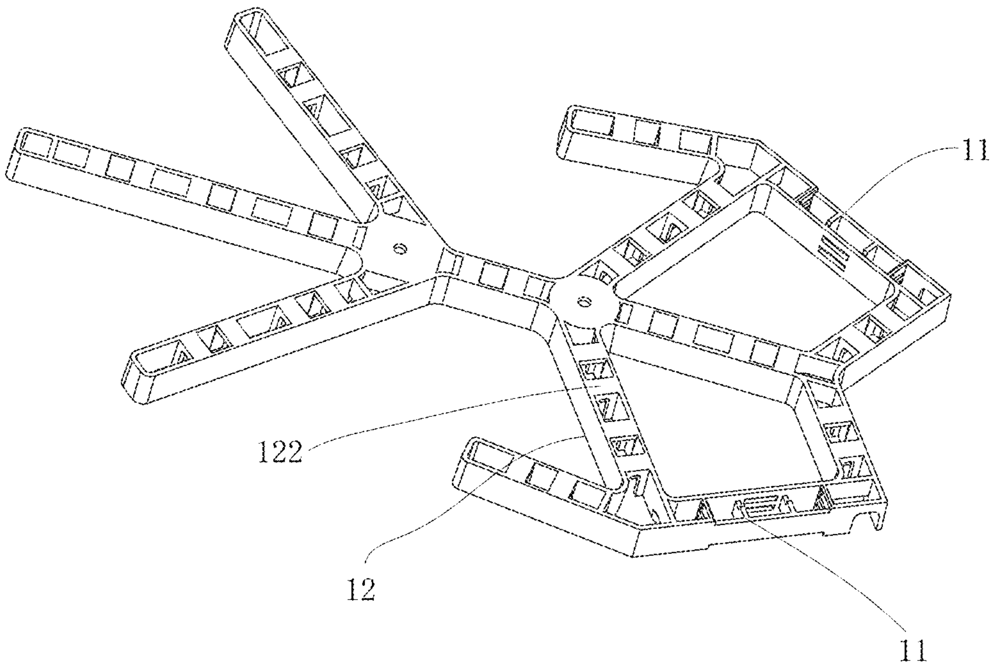
FIG. 4 is a structural schematic diagram of a support unit according to the first embodiment of the present disclosure.
Figure 8:
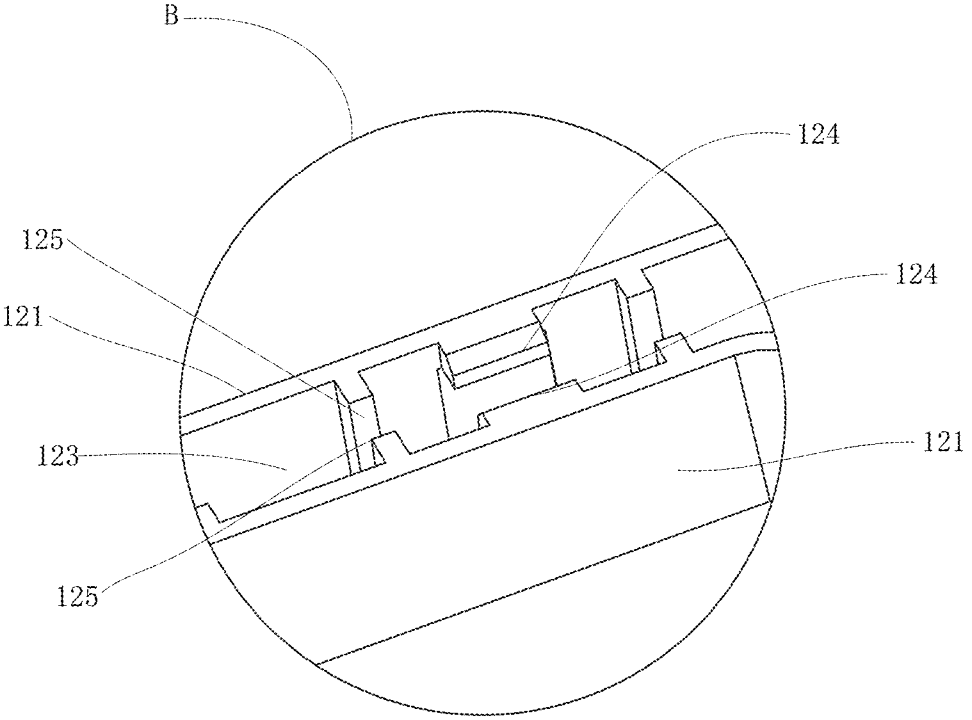
FIG. 8 is an enlarged schematic diagram of portion B shown in FIG. 6.

As shown in FIGS. 4, 5, and 8, each of the support frames 12 includes two support walls 121 being parallel with each other, the two support walls 121 are perpendicular to the plane, and the two support walls 121 extend along a length direction of a corresponding one of the support frames 12. Trailing edge plates 122 are disposed between the two support walls 121, the trailing edge plates 122 are connected with the two support walls 121, perpendicular to the two support walls 121, and parallel to the length direction of the corresponding one of the support frames 12. The two support walls 121 and the trailing edge plates 122 are enclosed to form a groove-shaped channel 123 of the corresponding one of the support frames 12, the groove-shaped channel 123 is in the fish-shaped framework in the plane and is configured to lay the flexible light strip along the length direction of the corresponding one of the support frames 12.

Figure 6:
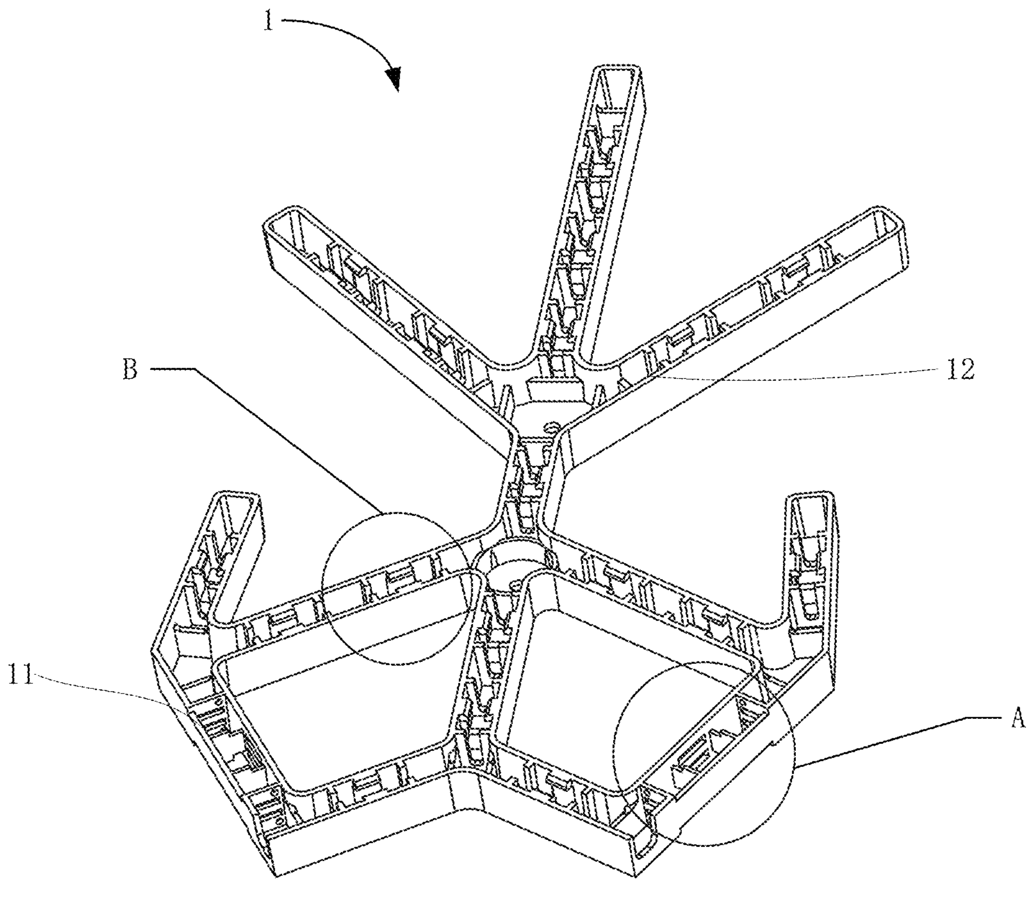
FIG. 6 is another structural schematic diagram of the support unit according to the first embodiment of the present disclosure.

Furthermore, as shown in FIGS. 6 and 8, limiting flanges 124 are respectively disposed at front edges of inner sides of the two support walls 121 of each of support frames 12 for preventing the flexible light strip from slipping off, the limiting flanges 124 are opposite to each other and are disposed at an interval, and each of the limiting flanges 124 is disposed along the length direction of the corresponding one of the support frames 12. Furthermore, positioning flanges 125 opposite to each other are respectively disposed on side edges of the trailing edge plates 122 and respectively extend frontward along inner sides of the two support walls 121, and the positioning flanges 125 are configured to limit the flexible light strip between the two support walls 121.

Figure 9:
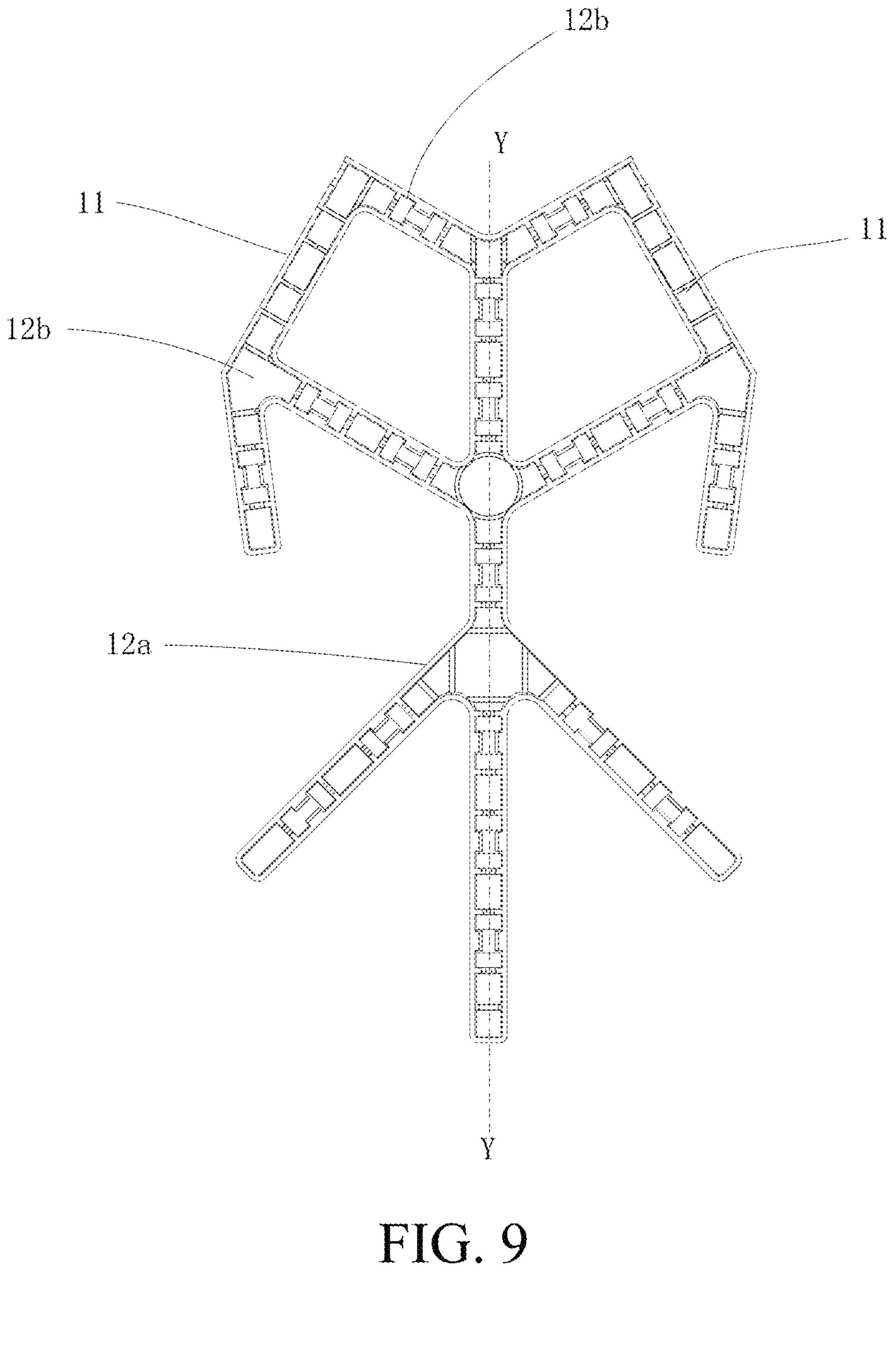
FIG. 9 is another structural schematic diagram of the support unit according to the first embodiment of the present disclosure.

It should be noted that, as shown in FIGS. 4, 6, and 9, each of the support frames 12 serve as a carrier of a corresponding one of the support units 1 for carrying the flexible light strip. Each of the support frames 12 includes a primary support frame 12*a* and secondary support frames 12*b*. A center line of the primary support frame 12*a* coincides with a symmetrical bisector Y-Y of the two lock catch frames 11 of each of the support units 1, and a tail portion of the primary support frame 12*a* has sub supports radially disposed. The secondary support frames 12*b* are communicated with the primary support frame 12*a* and are respectively disposed at both sides of the primary support frame 12*a*. Tail ends of corresponding secondary support frames 12*b* that connected to the primary support frame 12*a* are respectively connected to ends of the two lock catch frames 11. The support frames 12 are attractive in appearances and may combined to form a special pattern, such as a snowflake pattern, to achieve a more attractive appearance.

Figure 10:
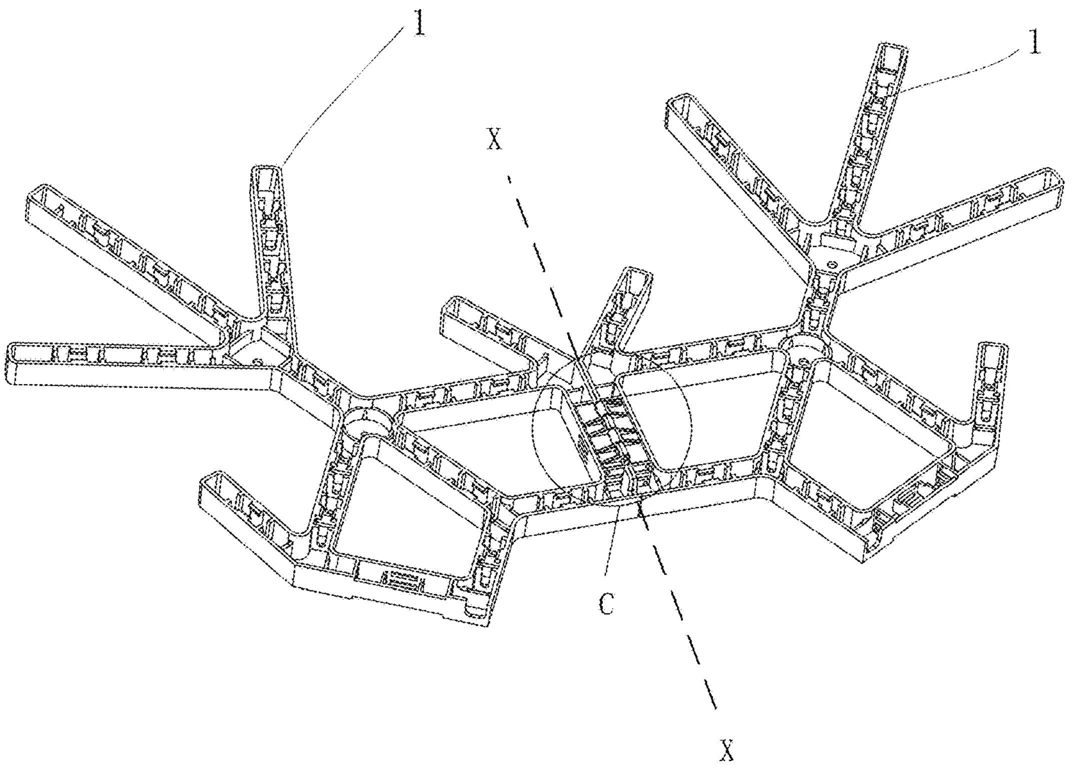
FIG. 10 is a schematic diagram of an unfolded state of two support units and the hinge unit according to the first embodiment of the present disclosure.
Figure 11:
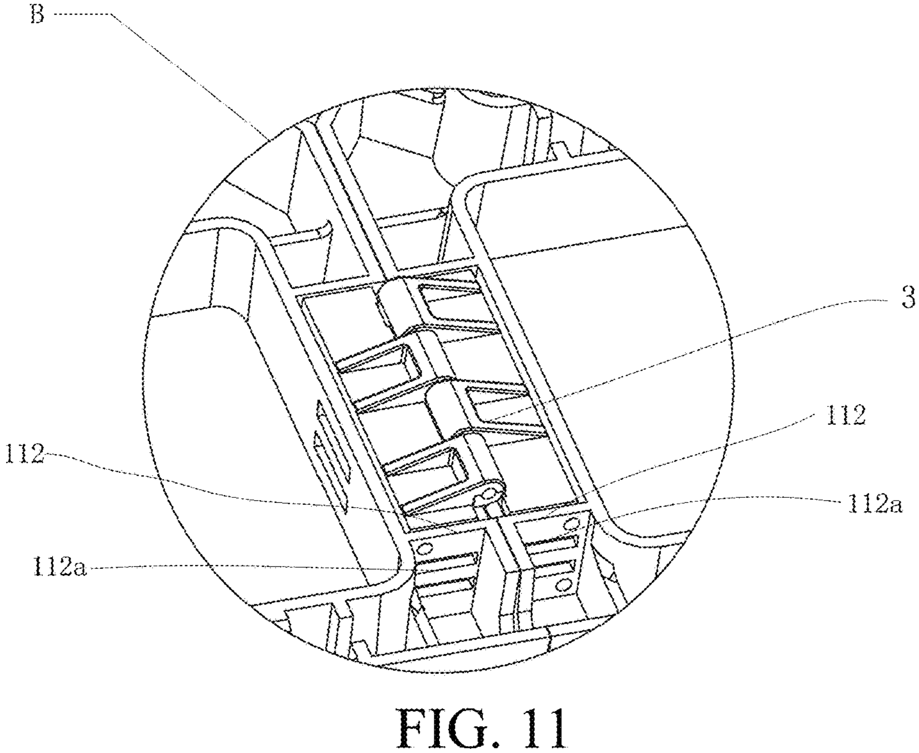
FIG. 11 is an enlarged schematic diagram of portion C shown in FIG. 10.
Figure 12:
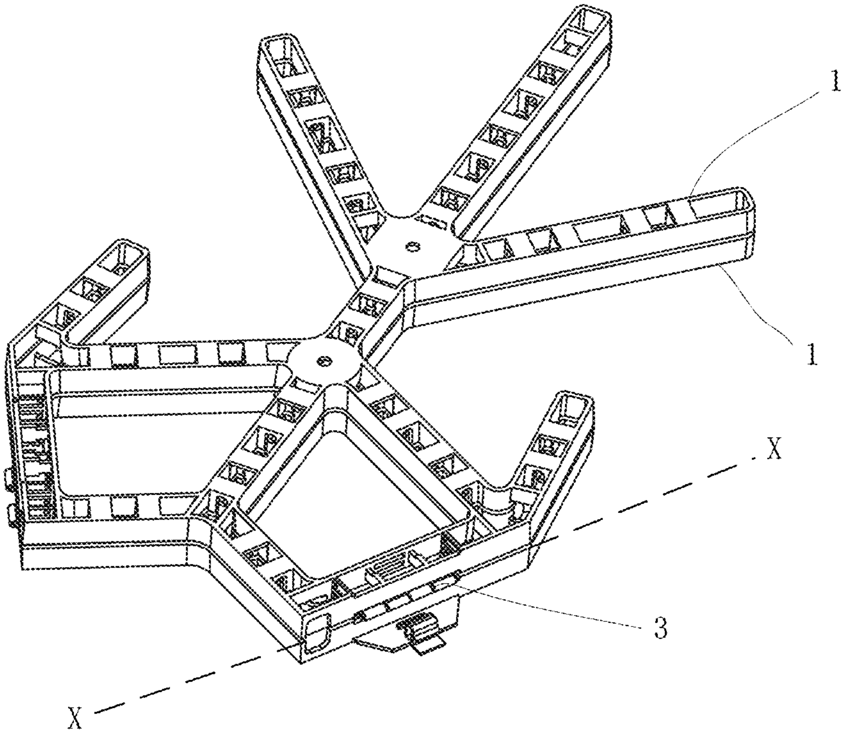
FIG. 12 is a schematic diagram of a folded state of two support units and the hinge unit according to the first embodiment of the present disclosure.

As shown in FIGS. 10-12, in the embodiment, for simplicity of illustration, only two support units 1 in an assembly mechanism are shown for description. Specifically, each of the hinge units 3 is disposed on adjacent lock catch frames 11 on different support units 1. Opening/closing directions of adjacent hinge units 3 are opposite, so that the adjacent support units 1 are capable of being continuously folded along a corresponding one of the boundary lines X. As shown in FIG. 10, groove-shaped channels of the adjacent support units 1 face the same side, and when the corresponding one of the hinge units 3 is disposed on two opposite lock catch frames 11 of the adjacent support units 1, the adjacent support units 1 are folded along the corresponding one of the boundary lines X and fit sides of the groove-shaped channels of the adjacent support units 1 together (as shown in FIG. 12). As shown in FIGS. 1 and 2, in the foldable light assembly of the embodiment, each of the hinge units 3 is disposed on adjacent lock catch frames 11 on the different support units 1, so that the adjacent support units 1 are capable of being continuously folded along the corresponding one of the boundary lines X.

Figure 13:
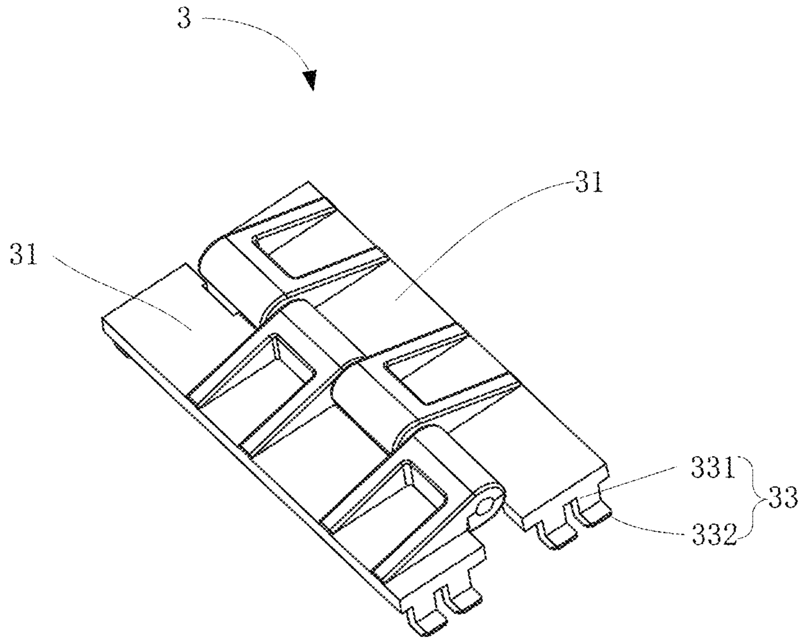
FIG. 13 is a structural schematic diagram of the hinge unit according to the first embodiment of the present disclosure.
Figure 14:
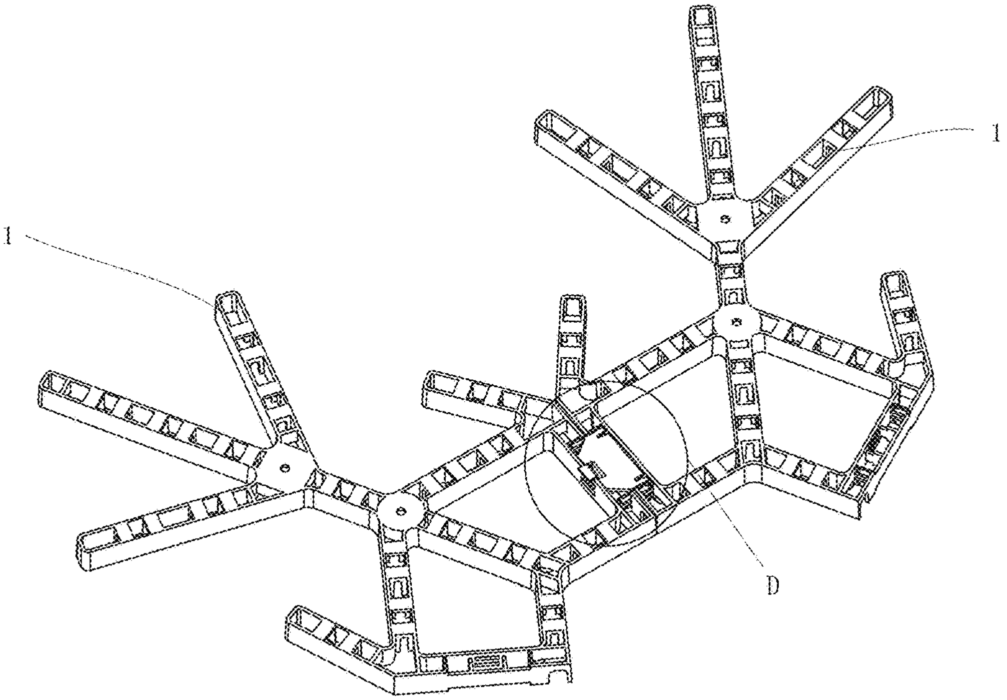
FIG. 14 is a structural schematic diagram of the two support units and the lock catch unit according to the first embodiment of the present disclosure.

As shown in FIGS. 10, 11, and 13, each of the hinge units 3 includes two hinges 31 being symmetrical. The two hinges 31 are respectively disposed in the adjacent lock catch frames 11 on the different support units 1, the two hinges are connected through a hinge pin of each of the hinge units 3, so that the adjacent support units 1 are connected through the hinge pin of each of the hinge units 3. In order to respectively mount each of the hinge units in the adjacent lock catch frames 11 on the different support units 1, elastic lock tongues 33 are respectively disposed at two ends of each of the two hinges 31 being symmetrical in an axis direction of the hinge pin and are respectively matched with the rectangular lock holes 112*a* (as shown in FIG. 7) on the two transverse support plates 112 in each of the two lock catch frames 11. When mounting the hinge units, the elastic lock tongues 33 of each of the two hinges are respectively connected into the rectangular lock holes 112*a* on the two transverse support plates 112, so as to quickly mount the two hinges in the adjacent lock catch frames 11 on the different support units 1. Since the hinge units are mounted without screws, mounting of which is quick and convenient.

As shown in FIGS. 7, 11, and 13, as an improvement on the elastic lock tongues 33 of each of the hinge units 3, each of the elastic lock tongues 33 mainly includes an elastic transverse section 331 and an inclined lock hook 332. The elastic transverse section 331 extends backward along an inner side of a corresponding one of the two transverse support plates 112 from two symmetrical ends of each of the two hinges 31 and is parallel to the corresponding one of the two transverse support plates 112. The inclined lock hook 332 extends from a tail portion of the elastic transverse section 331 toward a width direction of the elastic transverse section 331, and the inclined lock hook 332 is matched with a corresponding one of the rectangular lock holes 112*a* on a corresponding one of the two transverse support plates 112. When mounting the hinge units 3, the inclined lock hook 332 of each of the elastic lock tongues 33 of each of the two hinges is aligned with and connected with the corresponding one of the rectangular lock holes 112*a* on the corresponding one of the two transverse support plates 112, so that the inclined lock hook 332 of each of the elastic lock tongues 33 are smoothly inserted into the corresponding one of the rectangular lock holes 112*a* on the corresponding one of the two transverse support plates 112, in this way, the elastic lock tongues 33 of each of the hinge units 3 are respectively and stably connected into the rectangular lock holes 112*a* of the two transverse support plates 112 of each of the lock catch frames 11 of each of the support units. In the embodiment, the elastic lock tongues 33 of each of the hinge units 3 respectively cooperate with the rectangular lock holes 112*a* on the two transverse support plates 112 of each of the lock catch frames 11 of each of the support units, the screws are not need in such mounting manner, so that production and assembly efficiency of the foldable light assembly in greatly improved.

As shown in FIGS. 7, 10, and 13-15, in the embodiment, for simplicity of illustration, only two support units 1 and one lock catch unit 2 in an assembly mechanism are shown for description. The lock catch units 2 are configured to respectively connect the adjacent support units 1 through a quick locking manner. So that the adjacent support units 1 are stably connected. Each of the lock catch units 2 includes a lock catch plate 21. A first elastic pivot 22 and a second elastic pivot 22 are respectively disposed at two ends of the lock catch plate 21 being symmetrical in a length direction of the lock catch plate 21, axes of the first elastic pivot 22 and the second elastic pivot 22 are parallel to an axis of the hinge pin, and the first elastic pivot 22 and the second elastic pivot 22 are configured to be respectively connected into the pivot holes 112*b* on the transverse support plates 112 in each of the two lock catch frames 11. An elastic lock catch 23 having a U-shaped bend is disposed on a middle at one side in a width direction of the lock catch plate 21, and the elastic lock catch 23 is configured to be connected into the rectangular lock groove 111*a* defined on an adjacent lock catch wall 111 of an adjacent lock catch frame 11 and extending in a length direction of the adjacent lock catch wall 111. The first elastic pivot 22 and the second elastic pivot 22 on one side of a corresponding lock catch unit 2 is connected to one of two adjacent support units 1 through the hinge pin, and the elastic lock catch 23 on another side of the corresponding lock catch unit 2 is fixedly connected to a corresponding lock catch wall 111 of a corresponding lock catch frame 11 of the two adjacent lighting unit 1, so the two adjacent support units 1 are locked by the corresponding lock catch unit 2.

It should be noted that the lock catch plate 21 of each of the lock catch units 2 and the two hinges 31 of each of the hinge units are respectively disposed on two opposite sides of the adjacent lock catch frames 11 on the different support units 1 in a height direction of the adjacent lock catch frames 11, the lock catch plate 21 of each of the lock catch units 2 is disposed corresponding to the two hinges 31 of each of the hinge units. Rectangular notches 113 are respectively recessed from two edges in a height direction of one of the lock catch walls 11 facing the corresponding one of the boundary lines X, the rectangular notches 113 extend in the length direction of the one of the lock catch walls 111 and are configured to limit the two hinges 31 and the lock catch plate 21.

In use, when the lock catch units 2 respectively lock the adjacent support units 1, the adjacent support units 1 are in a stable unfolded state, and after the lock catch plate 21 of each of the lock catch units 2 is unlocked from the rectangular lock groove 111*a* defined on the adjacent lock catch wall 111 of the adjacent lock catch frame 11, the adjacent lighting units 1 are capable of being folded along the two hinges 31 of a corresponding one of the hinge unit 3.

Figure 15:
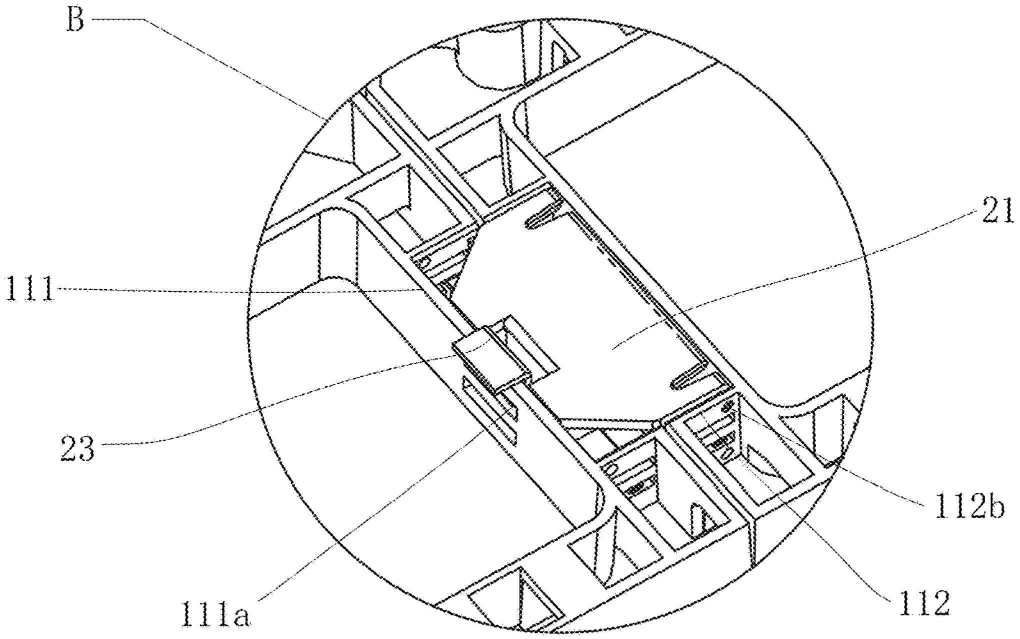
FIG. 15 is an enlarged schematic diagram of portion D shown in FIG. 14.
Figure 16:
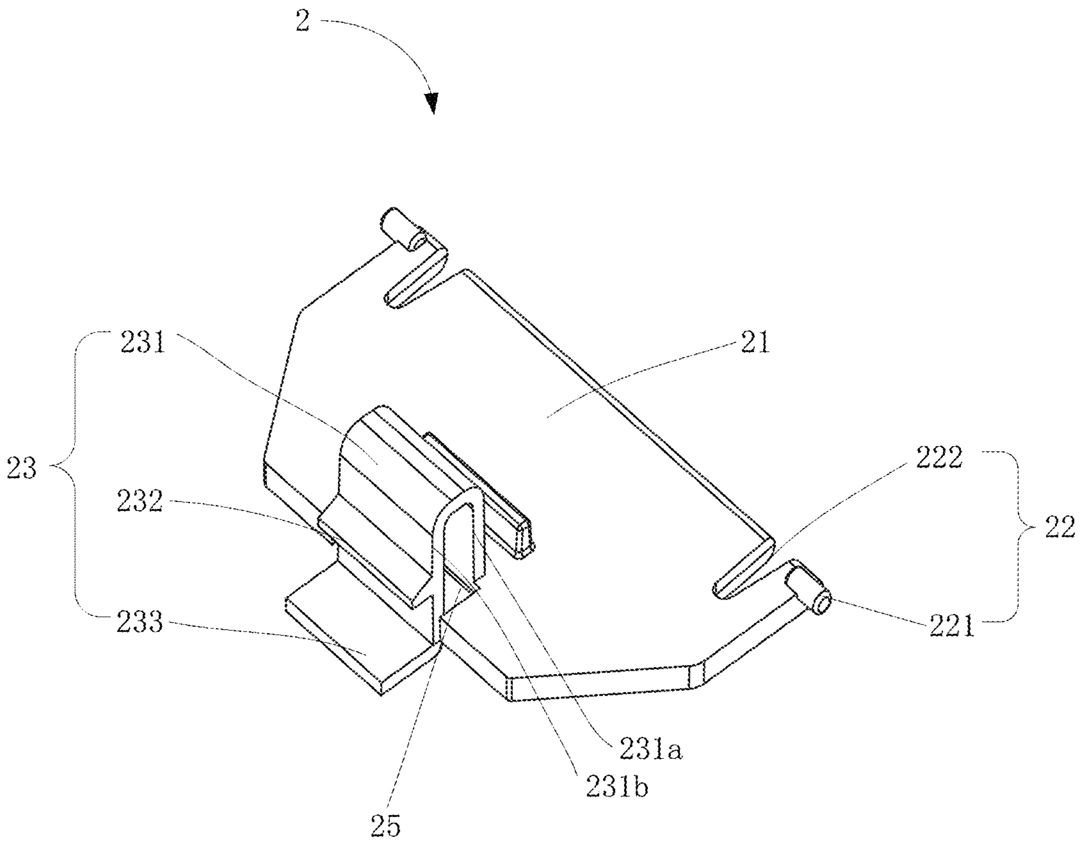
FIG. 16 is a structural schematic diagram of the lock catch unit according to the first embodiment of the present disclosure.

As shown in FIGS. 15 and 16, in the embodiment, each of the lock catch units includes a lock catch plate 21, a first elastic pivot 22, a second elastic pivot 22, and an elastic lock catch 23. The first elastic pivot 22 includes a first short shaft 221 and a first wedge groove 222, the second elastic pivot 22 includes a second short shaft 221 and a second wedge groove 222. The first short shaft 221 and the second short shaft 221 are coaxially disposed and are respectively matched with the pivot holes 112*b* on the transverse support plates 112 in each of the two lock catch frames 11. The first wedge groove 222 is connected to a root of the first short shaft 221, the second wedge groove 222 is connected to a root of the second short shaft 221, the first wedge groove 222 and the second wedge groove 222 are perpendicular to axis directions of the first elastic pivot 22 and the second elastic pivot 22 for elastic deformation of the first elastic pivot 22 and the second elastic pivot 22. When mounting the first elastic pivot 22 and the second elastic pivot 22, acting force is applied in the axis directions of the first elastic pivot 22 and the second elastic pivot 22, so that the first short shaft 221 of the first elastic pivot 22 and the second short shaft 221 of the second elastic pivot 22 are respectively squeezed inward along the axis directions of the first elastic pivot 22 and the second elastic pivot 22, and when the first short shaft 221 of the first elastic pivot 22 and the second short shaft 221 of the second elastic pivot 22 are respectively aligned with the pivot holes 112*b* on the transverse support plates 112 in each of the two lock catch frames 11 of each of the support units 1, the acting force on the first short shaft 221 of the first elastic pivot 22 and the second short shaft 221 of the second elastic pivot 22 are released, and the two short shafts 221 of the two elastic pivots 22 are respectively inserted into the pivot holes 112*b* to quickly mount the two elastic pivots of each of the lock catch units 2.

As shown in FIG. 16, a specific structure of the elastic lock catch 23 of each of the lock catch units 2 are illustrated, the elastic lock catch 23 includes a U-shaped elastic component 231. The U-shaped elastic component 231 includes an inner side piece 231*a* and an outer side piece 231*b*, the inner side piece 231*a* of the U-shaped elastic component 231 and the outer side piece 231*b* of the U-shaped elastic component 231 are perpendicular to a plane of the lock catch plate 21. The inner side piece 231*a* of the U-shaped elastic component 231 is connected to a middle of one side in a length direction of the lock catch plate 21, and a bottom of the U-shaped elastic component 231 extends backward along the two lock catch walls 111. A lock catch tongue 232 is disposed on the outer side piece 231*b* of the U-shaped elastic component 231, and the lock catch tongue 232 is matched with the rectangular lock groove 111*a* defined on the adjacent lock catch wall 111 of the adjacent lock catch frame 11. A manual shifting piece 233 is disposed at a front end of the outer side piece 231*b* of the U-shaped elastic component 231 away from a bottom of the U-shaped elastic component 231 and is configured to quickly operate a corresponding one of the lock catch units 2 in a lock processing. In use, the manual shifting piece 233 of each of the lock catch units 2 is operated to drive the lock catch tongue 232 of the elastic lock catch 23 to be separate from the rectangular lock groove 111*a* defined on the adjacent lock catch wall 111 of the adjacent lock catch frame 11, thereby unlocking the adjacent support units.

As shown in FIG. 16, as a further improvement on the elastic lock catch 23, a limiting notch 23 is defined at a side edge of the elastic lock catch 23 of the lock catch plate 21 for elastic deformation of the elastic lock catch 23 during operation, which is convenient for each of the lock catch units 2 to lock or unlock.

Figure 17:
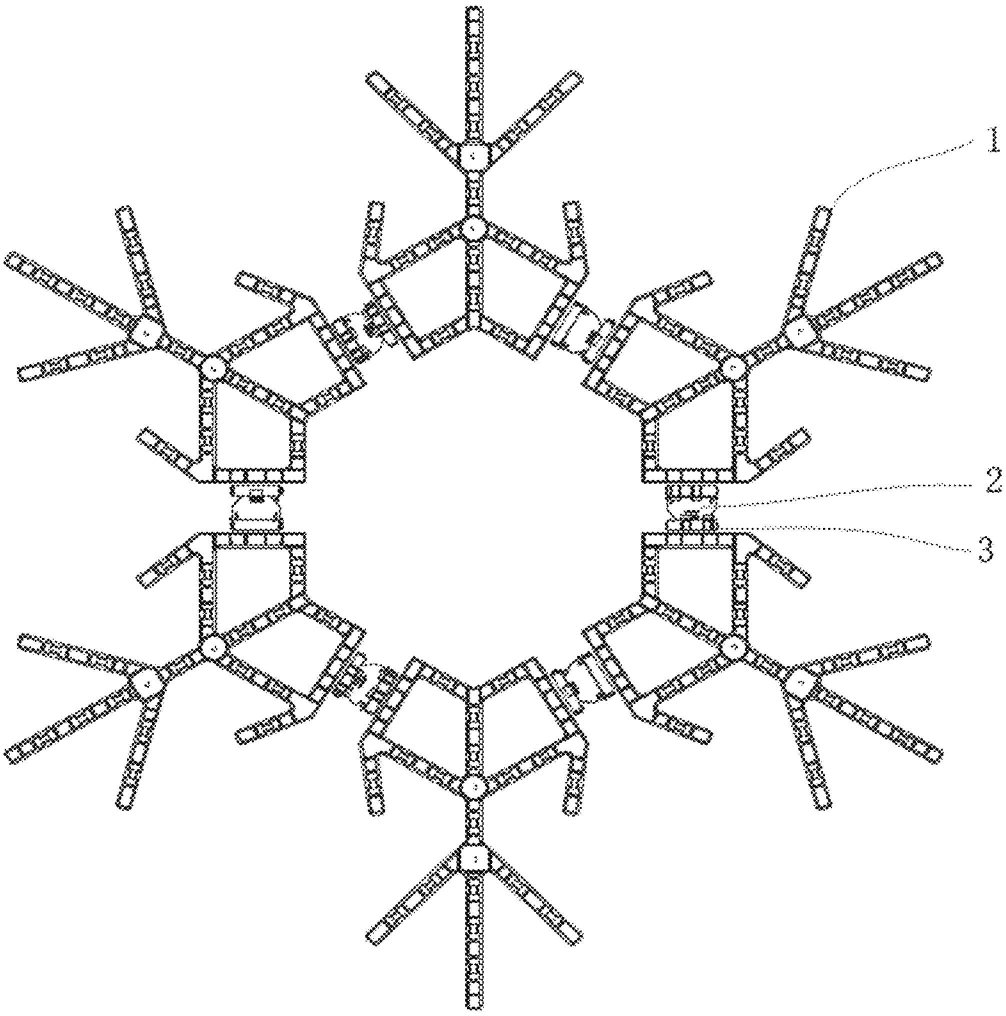
FIG. 17 is an exploded structural schematic diagram of the foldable light frame according to the first embodiment of the present disclosure.
Figure 18:
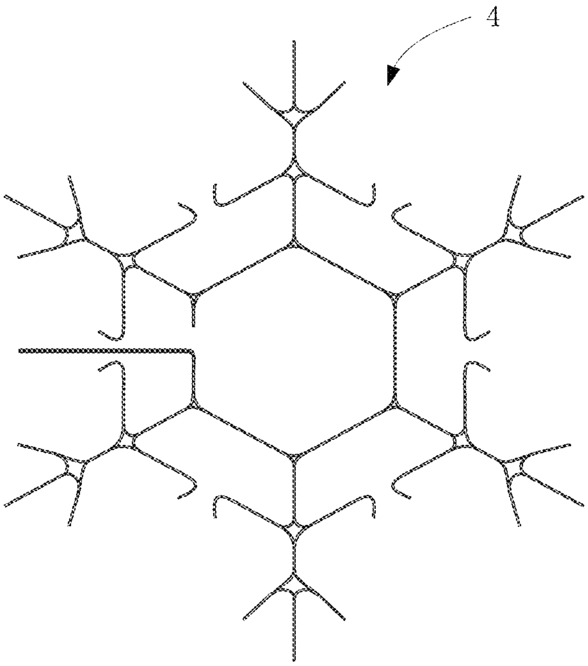
FIG. 18 is a schematic diagram of a flexible light strip according to the first embodiment of the present disclosure.

As shown in FIGS. 17-18, the foldable light assembly in the embodiment is mainly assembly by a group of support units 1, a group of lock catch units 2, a group of hinge units 3, and a set of flexible light strip.

Specifically, the group of the support units 1 includes six support units 1 to form a snowflake shape, groove-shaped channels of the six support units 1 face a first side, and trailing edge plate of the six support units 1 face a second side. The group of the lock catch units 2 include six lock catch units 2 configured to lock the six support units 1 with each other. The group of the hinge units 3 include five hinge units 3 configured to continuously fold the six support units 1 into six layers in sequence.

It should be not that, FIG. 17 is an exploded structural schematic diagram of the foldable light frame, the foldable light frame includes the group of the support units 1, the group of the lock catch units 2, and the group of the hinge units 3. The group of the support units 1 include the six support units 1 to form an annular shape in a plane. The group of the lock catch units 2 include the six lock catch units 2 configured to lock the six support units 1 with each other. The group of the hinge units 3 include the five hinge units 3. A corresponding lock catch unit 2 and a corresponding hinge unit 3 are disposed between two adjacent support units 1, the six lock catch units 2 and the five hinge units 3 are alternately distributed from one side of the plane, and the six lock catch units 2 and the five hinge units 3 are also alternately distributed from another side of the plane. The set of the flexible light strip 4 is disposed in the groove-shaped channels of support frames being in the snowflake shape, the flexible light strip 4 is electrically connected to a controller, a LED lamps are disposed on the flexible light strip 4. When the foldable light assembly is folded, the flexible light strip 4 is folded along with the support units 1. When using the foldable light assembly, the flexible light strip 4 is electrified, and the flexible light strip 4 having the LED lamps emits light, so that the foldable light assembly being in the snowflake shape has a more attractive appearance.

Second Embodiment

Figure 19:
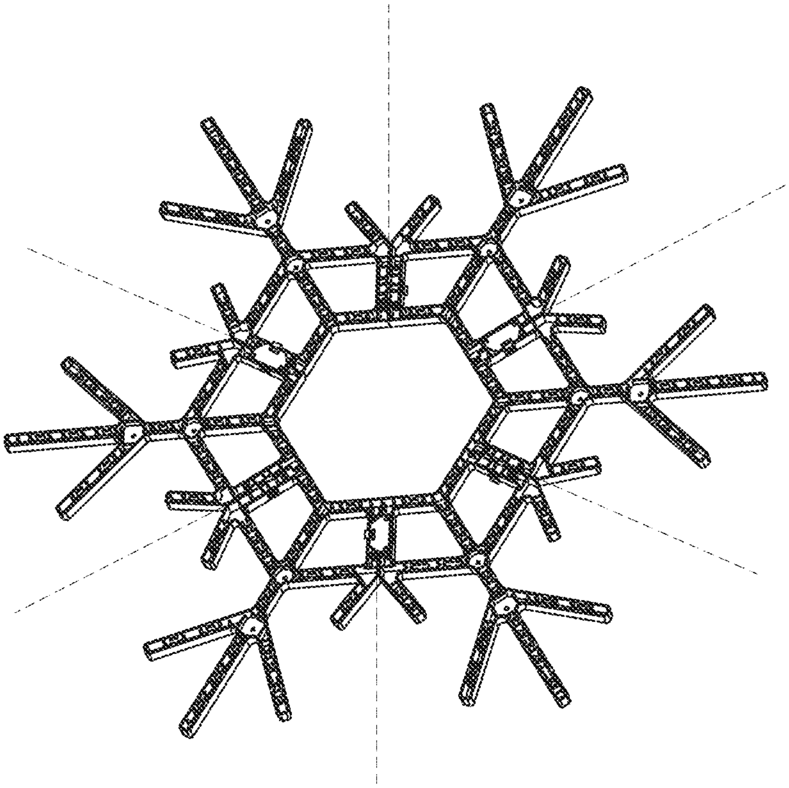
FIG. 19 is a structural schematic diagram of the foldable light assembly according to a second embodiment of the present disclosure.

As shown in FIG. 19, difference between the second embodiment and the first embodiment lies in that each of the support units is longer, but densities of the limiting flanges and the positioning flanges in the groove-shaped channels are unchanged.

It should be noted that, in the first embodiment and the second embodiment, the foldable light assembly include the six support units, each of the six support units has two side walls respectively facing an adjacent support unit, both an upper end and a lower end of each of the two side walls includes corresponding lock catch frames to mount a corresponding lock catch unit or a corresponding hinge unit. The six support units are connected to form a snowflake structure through the corresponding lock catch unit, the catch units and the hinge units between the six support units are alternately distributed when viewing in a vertical direction of the support units.

As shown in FIGS. 20-25, folding of the foldable light assembly is described as follows.

Figure 20:
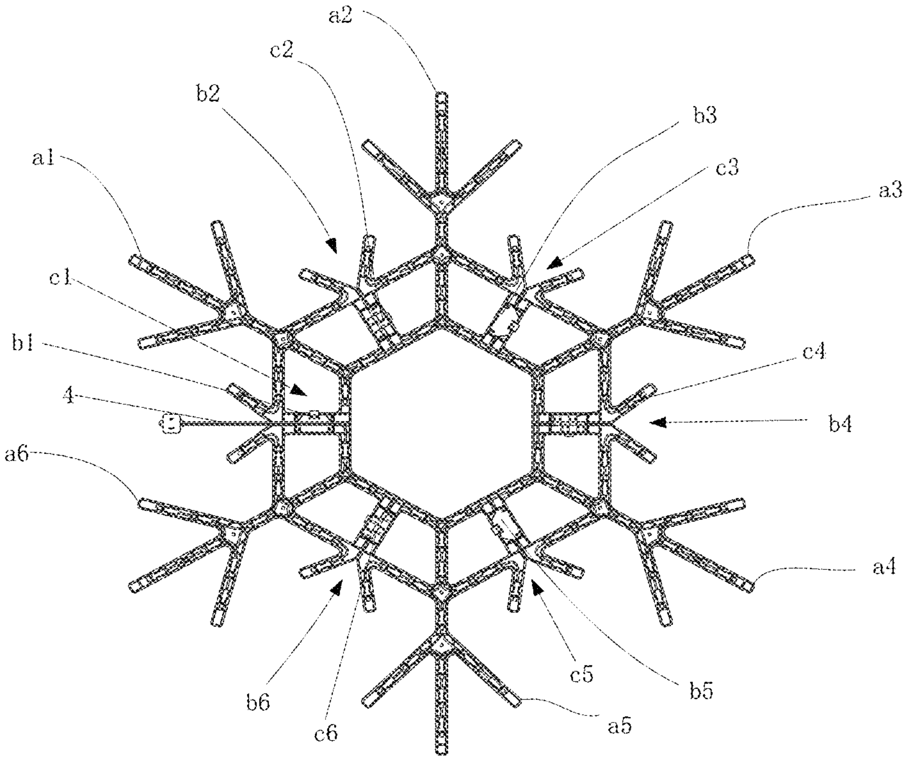
FIG. 20 is a schematic diagram of the foldable light assembly being in a use state according to the second embodiment of the present disclosure.

FIG. 20 is a schematic diagram of the foldable light assembly being in a use state according to the second embodiment of the present disclosure. The foldable light frame includes a group of support units, a group of lock catch units, and a group of hinge units. The group of the support units include six support units, the group of the lock catch units include six lock catch units, and the group of hinge units include the six hinge units, and the six support units are continuously folded into six layers in sequence. For ease of illustration, the six support units are numbered in sequence, the six support units are respectively numbered from a1 to a6; the six lock catch units are numbered in sequence, the six lock catch units are respectively numbered from b1 to b6; and the six hinge units are numbered in sequence, the six hinge units are respectively numbered from c1 to c6. A specific folding step of the foldable light assembly is as follows.

First, as shown in FIG. 20, a lock catch unit b1 and a hinge unit c1 between adjacent a support unit a1 and a support unit a6 are separated, meanwhile, the lock catch unit b1 is positioned on upper lock catch frames of the support unit a1 and the support unit a6, and the hinge unit c1 is positioned at lower lock catch frames of the support unit a1 and the support unit a6, that is, an elastic lock catch of the lock catch unit b1 is separated from a rectangular lock groove on a lock catch wall of the support unit a1, and a hinge pin of two hinges being symmetrical of the hinge unit c1 is pulled out to separate the support unit a1 and the support unit a6. In this step, it should be noted that the hinge unit c1 is assembled between the support unit a1 and the support unit a6 to increase stability of the foldable light assembly being in an unfolded state. Certainly, the hinge unit c1 between the support unit a1 and the support unit a6 may be omitted, that is, an operation of pulling the hinge pin of the two hinges being symmetrical of the hinge unit c1 out is omitted.

Figure 21:
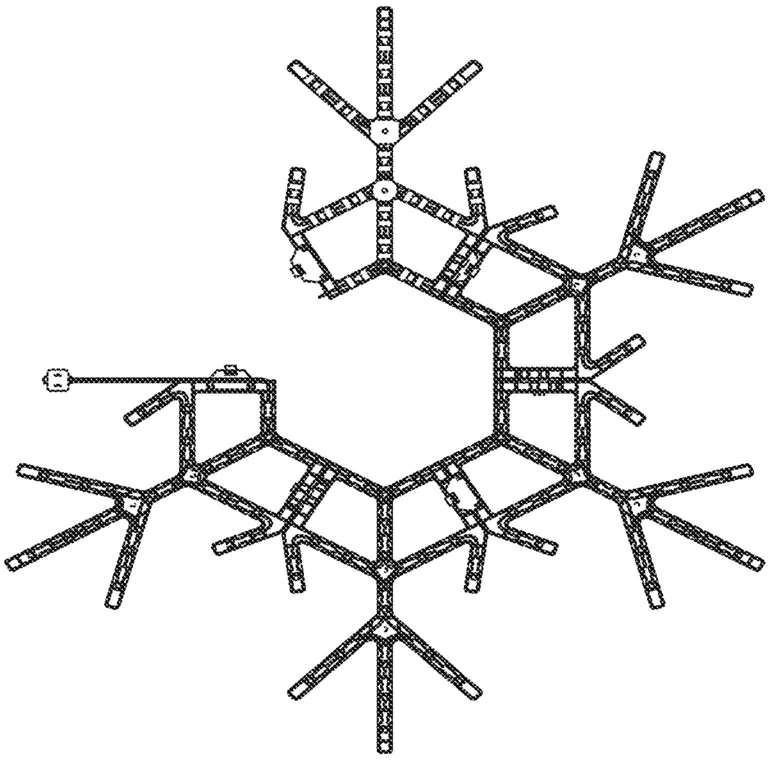
FIG. 21 is a schematic diagram of the foldable light assembly being in a first folded state.

Second, as shown in FIG. 21, a lock catch unit b2 is unlocked, the support unit a1 is folded frontward along a hinge unit c2, so that the support unit a1 and the support unit a2 are folded to fit together.

Figure 22:
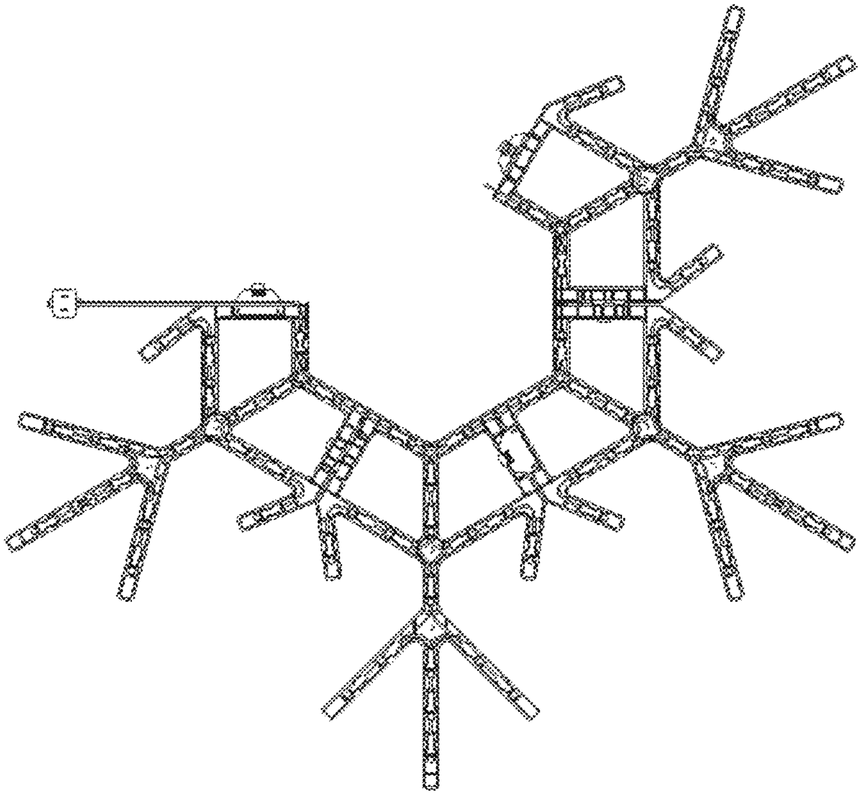
FIG. 22 is a schematic diagram of the foldable light assembly being in a second folded state.

Third, as shown in FIG. 22, a lock catch unit b3 is unlocked, the support unit a1 and the support unit a2 that are folded are together folded backward along a hinge unit c3, so that the support unit a1, the support unit a2, and the support unit a3 are folded together.

Figure 23:
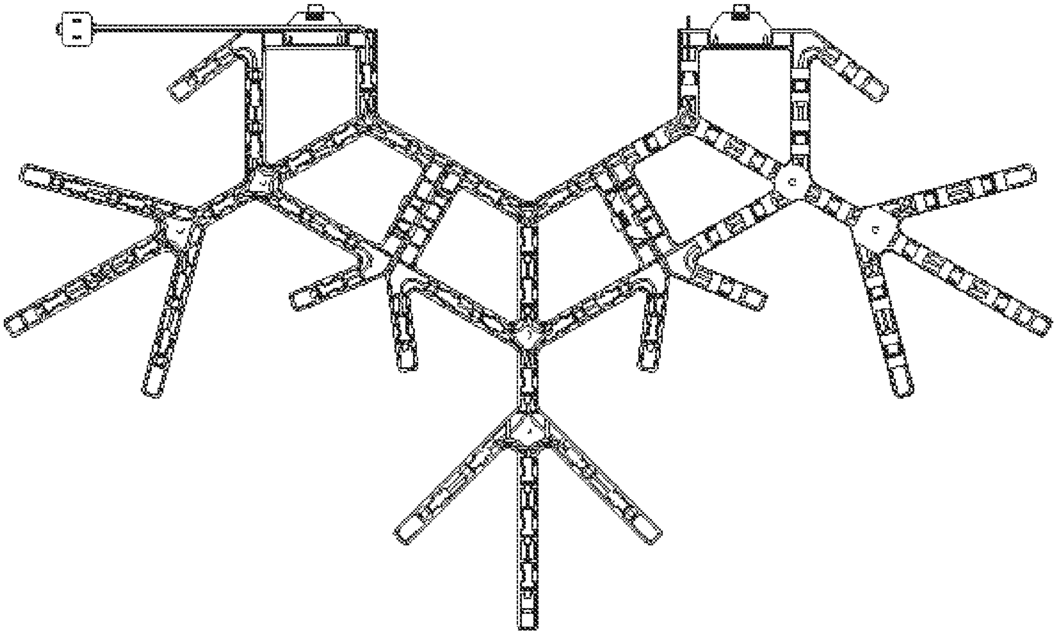
FIG. 23 is a schematic diagram of the foldable light assembly being in a third folded state.

Fourth, as shown in FIG. 23, the lock catch unit b4 is unlocked, the support unit a1, the support unit a2, and the support unit a3 that are folded together are together folded frontward along a hinge unit c4, so that the support unit a1, the support unit a2, the support unit a3, and the support unit a4 are folded together.

Figure 24:
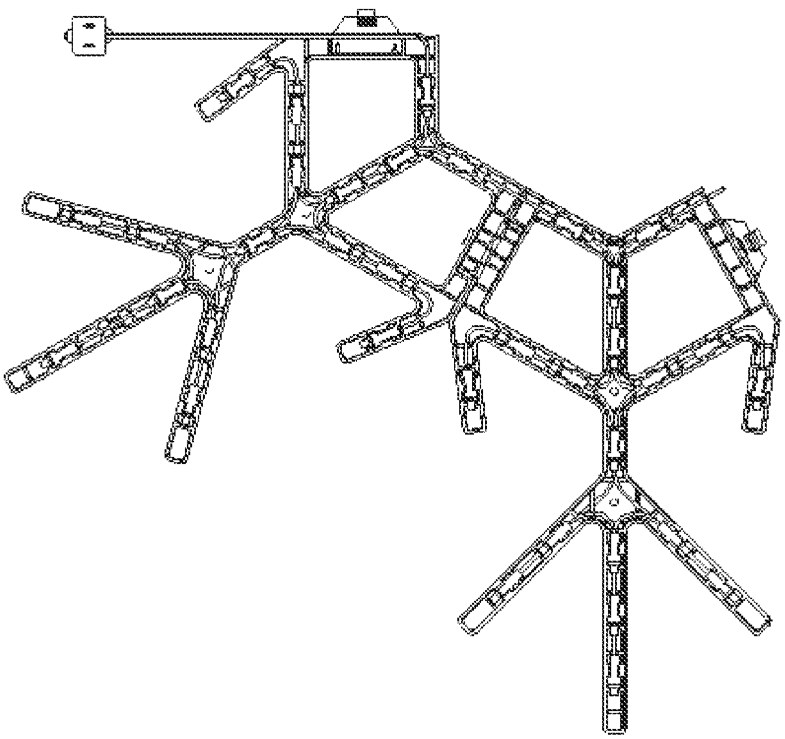
FIG. 24 is a schematic diagram of the foldable light assembly being in a fourth folded state.

Fifth, as shown in FIG. 24, the lock catch unit b5 is unlocked, the support unit a1, the support unit a2, the support unit a3, and the support unit a4 that are folded together are together folded backward along a hinge unit c5, so that the support unit a1, the support unit a2, the support unit a3, the support unit a4, and the support unit a5 are folded together.

Figure 25:
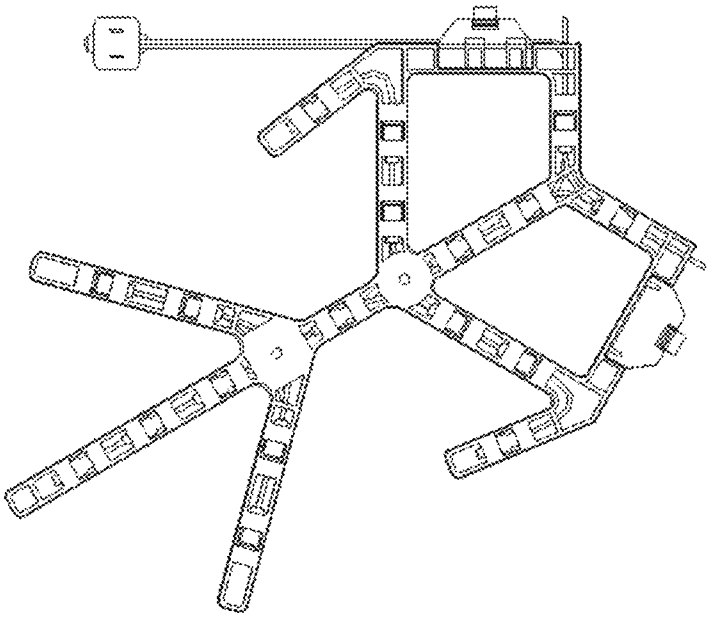
FIG. 25 is a schematic diagram of the foldable light assembly being in a fifth folded state.

Sixth, as shown in FIG. 25, the lock catch unit b6 is unlocked, the support unit a1, the support unit a2, the support unit a3, the support unit a4, and the support unit a5 that are folded together are together folded frontward along a hinge unit c6, so that the support unit a1, the support unit a2, the support unit a3, the support unit a4, the support unit a5, and the support unit a6 are folded together, and the foldable light assembly is fully folded.

It should be noted that, when folding the foldable light assembly, one of the six hinge units is first detached. Specifically, and a hinge pin of two hinges being symmetrical of the one of the six hinge units connecting any two adjacent support units is pulled out to separate the two hinges of the hinge unit, and other five hinge units are required to be detached. Therefore, the foldable light assembly after being folded include six support units, six lock catch units, and five hinge units. When the foldable light assembly is required to be unfolded, the hinge pin is re-mounted into the two hinges being symmetrical, and the six lock catch units lock two adjacent support units in sequence, so that the foldable light assembly is in the snowflake structure and is more stable in structure. At this time, the foldable light assembly includes six support units, six lock catch units, and six hinge units.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A foldable light assembly, comprising:

hinge units;

support units; and lock catch units;

wherein the support units are configured to form an annular shape in a plane, boundary lines are respectively formed between adjacent support units, and the boundary lines radially extend in the plane; the lock catch units are configured to respectively lock the adjacent support units;

wherein axes of the hinge units respectively extend along the boundary lines and are configured to connect the adjacent support units and fold the adjacent support units with each other;

wherein each of the support units is in a fish-shaped framework in the plane, and each of the support units comprises two lock catch frames and support frames;

wherein the two lock catch frames are respectively disposed at two sides of each of the support units that form the boundary lines and are configured to mount corresponding lock catch units and corresponding hinge units; and the support frames and the two lock catch frames extend in the plane and are connected with each other, and the support frames are configured to mount a flexible light strip.

2. The foldable light assembly according to claim 1, wherein each of the two lock catch frames comprises two lock catch walls being parallel with each other, the two lock catch walls are perpendicular to the plane, and the two lock catch walls extend along a length direction of a corresponding one of the two lock catch frames; and transverse support plates are disposed between the two lock catch walls, the transverse support plates are connected with the two lock catch walls, perpendicular to the two lock catch walls, and perpendicular to the length direction of the corresponding one of the two lock catch frames.

3. The foldable light assembly according to claim 2, wherein each of the support frames comprises two support walls being parallel with each other, the two support walls are perpendicular to the plane, and the two support walls extend along a length direction of a corresponding one of the support frames;

trailing edge plates are disposed between the two support walls, the trailing edge plates are connected with the two support walls, perpendicular to the two support walls, and parallel to the length direction of the corresponding one of the support frames; and the two support walls and the trailing edge plates are enclosed to form a groove-shaped channel, the groove-shaped channel is configured to lay the flexible light strip along the length direction of the corresponding one of the support frames.

4. The foldable light assembly according to claim 3, wherein each of the hinge units is disposed on adjacent lock catch frames on different support units; opening/closing directions of adjacent hinge units are opposite, so that the adjacent support units are capable of being continuously folded along a corresponding one of the boundary lines.

5. The foldable light assembly according to claim 4, wherein each of the hinge units comprises:

two hinges being symmetrical;

wherein the two hinges are respectively disposed in the adjacent lock catch frames on the different support units, and the adjacent support units are connected through a hinge pin of each of the hinge units; and elastic lock tongues are respectively disposed at two ends of each of the two hinges being symmetrical in an axis direction of the hinge pin and are configured to be respectively connected into rectangular lock holes on the transverse support plates in each of the two lock catch frames.

6. The foldable light assembly according to claim 5, wherein each of the lock catch units comprises:

a lock catch plate;

wherein a first elastic pivot and a second elastic pivot are respectively disposed at two ends of the lock catch plate being symmetrical in a length direction of the lock catch plate, axes of the first elastic pivot and the second elastic pivot are parallel to an axis of the hinge pin, and the first elastic pivot and the second elastic pivot are configured to be respectively connected into pivot holes on the transverse support plates in each of the two lock catch frames;

an elastic lock catch having a U-shaped bend is disposed on a middle at one side in a width direction of the lock catch plate, and the elastic lock catch is configured to be connected into a rectangular lock groove defined on an adjacent lock catch wall of an adjacent lock catch frame and extending in a length direction of the adjacent lock catch wall; and the lock catch plate and the two hinges are respectively disposed at two opposite sides of one of the two lock catch frames in a height direction thereof, the lock catch plate is disposed corresponding to the two hinges.

7. The foldable light assembly according to claim 6, wherein rectangular notches are respectively recessed from two edges in a height direction of one of the lock catch walls facing the corresponding one of the boundary lines, the rectangular notches extend in a length direction of the one of the lock catch walls and are configured to limit the two hinges and the lock catch plate.

8. The foldable light assembly according to claim 5, wherein each of the elastic lock tongues comprises:

an elastic transverse section; and an inclined lock hook;

wherein the elastic transverse section extends backward along an inner side of a corresponding one of the transverse support plates and is parallel to the corresponding one of the transverse support plates; and the inclined lock hook extends from a tail portion of the elastic transverse section toward a width direction of the elastic transverse section, and the inclined lock hook is matched with a corresponding one of the rectangular lock holes on a corresponding one of the transverse support plates in each of the two lock catch frames.

9. The foldable light assembly according to claim 6, wherein the first elastic pivot comprises a first short shaft and a first wedge groove, the second elastic pivot comprises a second short shaft and a second wedge groove;

the first short shaft and the second short shaft are coaxially disposed and are respectively matched with the pivot holes; and the first wedge groove is connected to a root of the first short shaft, the second wedge groove is connected to a root of the second short shaft, the first wedge groove and the second wedge groove are perpendicular to axis directions of the first elastic pivot and the second elastic pivot for elastic deformation of the first elastic pivot and the second elastic pivot.

10. The foldable light assembly according to claim 6, wherein the elastic lock catch comprises a U-shaped elastic component; the U-shaped elastic component comprises an inner side piece and an outer side piece, the inner side piece of the U-shaped elastic component and the outer side piece of the U-shaped elastic component are perpendicular to a plane of the lock catch plate; the inner side piece of the U-shaped elastic component is connected to a middle of one side in a length direction of the lock catch plate, and a bottom of the U-shaped elastic component extends backward along the two lock catch walls;

a lock catch tongue is disposed on the outer side piece of the U-shaped elastic component, and the lock catch tongue is matched with the rectangular lock groove defined on the adjacent lock catch wall of the adjacent lock catch frame; and a manual shifting piece is disposed at a front end of the outer side piece of the U-shaped elastic component away from a bottom of the U-shaped elastic component and is configured to quickly operate a corresponding one of the lock catch units in a lock processing.

11. The foldable light assembly according to claim 6, wherein a limiting notch is defined at a side edge of the elastic lock catch of the lock catch plate for elastic deformation of the elastic lock catch during operation.

12. The foldable light assembly according to claim 3, wherein each of the support frames comprises a primary support frame and secondary support frames;

a center line of the primary support frame coincides with a symmetrical bisector of the two lock catch frames of each of the support units, and a tail portion of the primary support frame has sub supports radially disposed;

the secondary support frames are communicated with the primary support frame and are respectively disposed at both sides of the primary support frame; and tail ends of corresponding secondary support frames that connected to the primary support frame are respectively connected to ends of the two lock catch frames.

13. The foldable light assembly according to claim 3, wherein limiting flanges are respectively disposed at front edges of inner sides of the two support walls of each of support frames for preventing the flexible light strip from slipping off, the limiting flanges are opposite to each other and are disposed at an interval, and each of the limiting flanges is disposed along the length direction of the corresponding one of the support frames.

14. The foldable light assembly according to claim 3, wherein positioning flanges opposite to each other are respectively disposed on side edges of the trailing edge plates and respectively extend frontward along inner sides of the two support walls, and the positioning flanges are configured to limit the flexible light strip between the two support walls.

15. The foldable light assembly according to claim 3, wherein six support units, six lock catch units, and five hinge units are provided; the six support units are configured to enclose to form the annular shape, so that six support frames form a snowflake structure; the six lock catch units are configured to lock the six support units with each other; and the five hinge units are configured to continuously fold the six support units into six layers in sequence.

16. The foldable light assembly according to claim 15, comprising:

the six support units;

the six lock catch units;

the five hinge units; and the flexible light strip.

* * * * *